US008806455B1

(12) United States Patent  
Katz

(10) Patent No.: US 8,806,455 B1  
(45) Date of Patent: Aug. 12, 2014

(54) SYSTEMS AND METHODS FOR TEXT NUCLEARIZATION

(75) Inventor: Eliezer Katz, Modiin (IL)

(73) Assignee: Verint Systems Ltd. (IL)

( * ) Notice: Subject to any disclaimer, the term of this patent is extended or adjusted under 35 U.S.C. 154(b) by 1032 days.

(21) Appl. No.: 12/491,855

(22) Filed: Jun. 25, 2009

Related U.S. Application Data

(60) Provisional application No. 61/075,744, filed on Jun. 25, 2008.

(51) Int. Cl.  
*G06F 9/45* (2006.01)

(52) U.S. Cl.  
USPC .......................................... 717/142; 382/176

(58) Field of Classification Search  
None  
See application file for complete search history.

(56) References Cited

U.S. PATENT DOCUMENTS

| 6,052,657 | A | * | 4/2000 | Yamron et al. | 704/9 |
| 7,433,893 | B2 | * | 10/2008 | Lowry | 1/1 |
| 2002/0016787 | A1 | * | 2/2002 | Kanno | 707/5 |
| 2004/0054973 | A1 | * | 3/2004 | Yamamoto | 715/530 |
| 2006/0294100 | A1 | * | 12/2006 | Meyerzon et al. | 707/7 |
| 2008/0148147 | A1 | * | 6/2008 | Poston et al. | 715/273 |
| 2009/0067719 | A1 | * | 3/2009 | Sridhar et al. | 382/176 |
| 2009/0076795 | A1 | * | 3/2009 | Bangalore et al. | 704/9 |
| 2010/0179811 | A1 | * | 7/2010 | Gupta et al. | 704/235 |
| 2010/0278428 | A1 | * | 11/2010 | Terao et al. | 382/177 |

* cited by examiner

*Primary Examiner* — Elias Mamo  
(74) *Attorney, Agent, or Firm* — Meunier Carlin & Curfman

(57) ABSTRACT

A computer-implemented method for text processing includes processing at least one body of text including semantic elements. Syntactic roles of the respective semantic elements are recognized, and the body of text is segmented into individual semantic constructs. At least one selected semantic element is removed from the semantic constructs, so as to produce respective nuclear semantic constructs. Occurrence frequencies of the respective nuclear semantic constructs are computed. An action is invoked with respect to one or more of the nuclear semantic constructs whose occurrence frequencies meet a predefined condition.

12 Claims, 2 Drawing Sheets

SYSTEMS AND METHODS FOR TEXT NUCLEARIZATION

RELATED APPLICATIONS

The present applications is related to and claims priority to U.S. Provisional Patent Application No. 61/075,744, entitled SYSTEMS AND METHODS FOR TEXT NUCLEARIZATION, filed on Jun. 25, 2008, which is hereby incorporated by reference in its entirety.

FIELD OF THE DISCLOSURE

The present disclosure relates generally to text processing and computational linguistics, and particularly to methods and systems for applying statistical processing to transcribed text.

BACKGROUND OF THE DISCLOSURE

Various text processing applications perform statistical analysis of text. For example, some known methods carry out statistical analysis of transcribed text that originates from recorded call center sessions. Results of the statistical analysis are used, for example, to automatically identify root causes of customer complaints, to assist users in defining search queries for searching the text, and for performing various business analytics tasks.

SUMMARY OF THE DISCLOSURE

Embodiments of the present disclosure provide a computer-implemented method for text processing, including:

processing at least one body of text including semantic elements;

recognizing respective syntactic roles of the semantic elements;

segmenting the body of text into individual semantic constructs;

removing at least one selected semantic element from the semantic constructs, so as to produce respective nuclear semantic constructs;

computing respective occurrence frequencies of the nuclear semantic constructs; and invoking an action with respect to one or more of the nuclear semantic constructs whose occurrence frequencies meet a predefined condition.

In some embodiments, the body of text includes transcribed audio of call center sessions. In an embodiment, invoking the action includes prioritizing at least some of the nuclear semantic constructs and presenting the prioritized nuclear semantic constructs to a user. In another embodiment, removing the at least one selected semantic element includes predefining a nuclearization depth, and determining the selected semantic elements to be removed responsively to the predefined nuclearization depth. In yet another embodiment, the semantic constructs include sentences. In a disclosed embodiment, computing the occurrence frequencies includes assigning respective weights to occurrences of the nuclear semantic constructs, and computing the occurrence frequencies responsively to the weights.

There is also provided, in accordance with an embodiment of the present disclosure, a computer-implemented method for text processing, including:

processing one or more semantic constructs including semantic elements;

recognizing respective syntactic roles of the semantic elements;

representing the semantic constructs by respective hierarchical data structures, which represent hierarchical relationships among the semantic elements of the respective semantic constructs;

removing at least one selected semantic element from the hierarchical data structures, so as to produce respective nuclear data structures; and invoking an action with respect to the nuclear data structures.

In some embodiments, the method includes computing respective occurrence frequencies of the nuclear data structures, and the action is invoked with respect to one or more of the nuclear data structures whose occurrence frequencies meet a predefined condition. In an embodiment, the semantic constructs include transcribed audio of call center sessions. Invoking the action may include prioritizing at least some of the nuclear data structures and presenting the prioritized nuclear data structures to a user. Removing the at least one selected semantic element may include predefining a nuclearization depth, and determining the selected semantic elements to be removed responsively to the predefined nuclearization depth. The semantic constructs may include sentences.

There is additionally provided, in accordance with an embodiment of the present disclosure, apparatus for text processing, including:

an interface, which is operative to accept a body of text, which originates from audio of call center sessions and includes semantic elements; and a processor, which is coupled to process the body of text so as to recognize respective syntactic roles of the semantic elements, to segment the body of text into individual semantic constructs responsively to the recognized syntactic roles, to remove selected semantic elements from the semantic constructs so as to transform the semantic constructs into respective nuclear semantic constructs, to compute respective occurrence frequencies of the nuclear semantic constructs, and to invoke an action with respect to one or more of the nuclear semantic constructs whose occurrence frequencies meet a predefined condition.

There is further provided, in accordance with an embodiment of the present disclosure, apparatus for text processing, including:

an interface, which is operative to accept one or more semantic constructs, which originate from audio of call center sessions and include semantic elements; and a processor, which is coupled to process the one or more semantic constructs so as to recognize respective syntactic roles of the semantic elements, to represent the semantic constructs by respective hierarchical data structures responsively to the recognized syntactic roles, such that the data structures represent hierarchical relationships among the semantic elements of the respective semantic constructs, to remove selected semantic elements from the hierarchical data structures so as to transform the data structures into respective nuclear data structures, and to invoking an action with respect to the nuclear data structures.

The present disclosure will be more fully understood from the following detailed description of the embodiments thereof, taken together with the drawings in which:

DETAILED DESCRIPTION OF EMBODIMENTS

Overview

Figure 1:
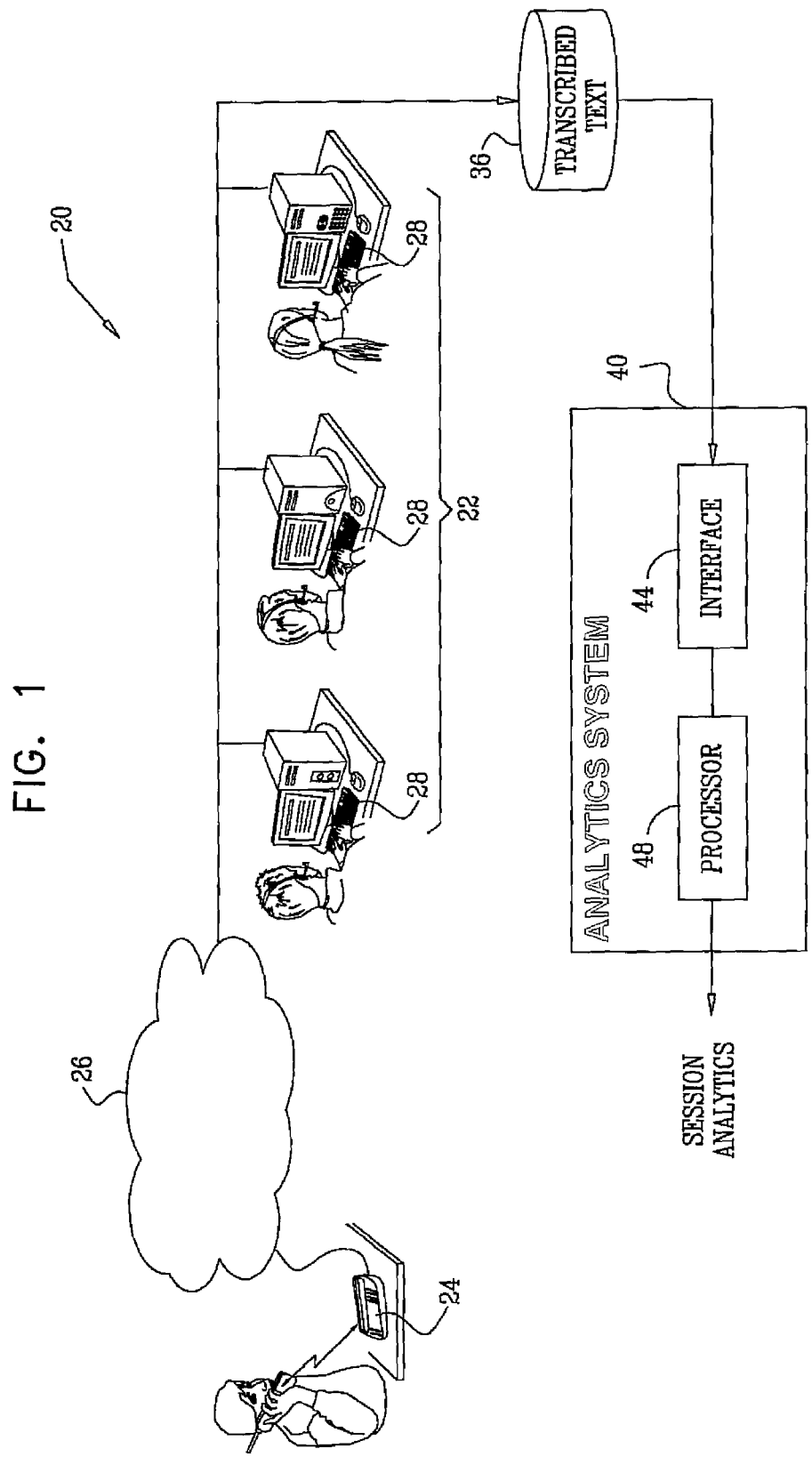
FIG. 1 is a block diagram that schematically illustrates a call center, in accordance with an embodiment of the present disclosure.

Statistical analysis methods that are applied to text often rely on the ability to identify commonalities and similarities in the text, such as recurring words or phrases, and to assess the statistical significance of these similarities. For example, a statistical application may scan the text, calculate the occurrence frequency of each word found therein, and draw the attention of a user to the most frequently-occurring words.

Such processes, however, are usually limited to processing individual words or short phrases, which can be readily compared with one another. The task of comparing and associating sentences and other complex constructs is considerably more complicated, since sentences that convey similar semantic meanings may vary from one another in ways that render their comparison and statistical aggregation nearly impossible. For example, sentences having similar meanings may differ in words that are not directly related to the essence of the sentence; the words in such sentences may be arranged in different orders; or the sentences may have different syntactic structures and/or contain other sorts of variations. Because of these variations, known text analysis methods are often ineffective in applying statistical analysis to sentences and other complex semantic constructs.

Embodiments of the present invention provide improved methods and systems for statistical text processing, which overcome the wide variability in sentences and other complex semantic constructs. In some embodiments that are described hereinbelow, a processor accepts a set of transcribed sentences, each comprising semantic elements (e.g., words or phrases). In some embodiments, the sentences originate from transcribed audio of call center sessions. The processor analyzes the sentences, and recognizes the syntactic roles of the semantic elements found therein.

The processor removes selected semantic elements from the sentence, thus transforming the sentences into respective nuclear sentences. This process is referred to herein as nuclearization, and is performed based on the recognized syntactic roles of the different semantic elements. When converting a given sentence to the corresponding nuclear sentence, the processor attempts to retain the words or phrases that convey the semantic meaning or essence of the sentence and to remove other elements.

The nuclearization process described herein brings different transcribed sentences to a common, comparable form. Once the different sentences are brought to such form, sentences that convey similar meanings can be associated with one another and various statistics can be computed over them. Without nuclearization, sentences that are semantically similar might not be associated with one another, and the statistical significance they have might not be recognized.

In some embodiments, the processor calculates the occurrence frequencies of the different nuclear sentences, and may invoke appropriate action. For example, the processor may prioritize the nuclear sentences in accordance with their occurrence frequencies and present the most frequently-occurring nuclear sentences to a user.

In some embodiments, the processor represents each input sentence by a hierarchical data structure, based on the syntactic roles of the words or phrases in the sentence. The data structures represent the hierarchical relationships among the semantic elements of the respective sentences. The processor applies the nuclearization process to the hierarchical data structures, so as to produce respective nuclear data structures that may be readily compared with one another.

In some embodiments, the processor accepts a body of transcribed text as input, and automatically segments the body of text into individual sentences based on the recognized syntactic roles of the different semantic elements.

System Description

FIG. 1 is a schematic pictorial illustration of a voice communication system 20, in accordance with an embodiment of the present disclosure. This particular system is shown solely by way of example, to illustrate a typical context in which an embodiment of the present disclosure may be used. System 20 comprises a call center 22, which receives telephone calls from users of subscriber terminals (such as a telephone 24) via a network 26. The network and telephone are shown generically in FIG. 1, and may typically comprise either circuit-switched or packet-based equipment, or both.

Agents in call center 22 receive and place calls via agent terminals 28. Some or all of these calls may be recorded for purposes such as record-keeping and follow-up, dispute resolution, analysis of performance of call center representatives and/or business analytics. Some or all of the calls may be transcribed, i.e., converted to text. The transcribed text is stored in a transcription database 36, typically in digital form on a magnetic disk or tape, for example.

The transcribed text is analyzed by an analytics system 40. System 40 may carry out various analytics functions with respect to the transcribed text stored in database 36, such as retrieving words or phrases of interest, determining root causes of customer complaints, refining search queries entered by users for searching the text, finding similarities between bodies of text, and/or any other suitable analytics task. The analytics results produced by system 40 are presented to a user, e.g., an analyst. Alternatively, the analytics results may be exported to another computerized system for further processing.

System 40 comprises an interface 44 for interacting with database 36, and a processor 48, which carries out the nuclearization methods described herein. Processor 48 typically comprises a general-purpose computer, which has suitable input and output interfaces and is programmed in software to carry out the functions that are described herein. The software may be downloaded to the computer in electronic form, over a network, for example, or it may, alternatively or additionally, be stored on tangible media, such as optical, magnetic or electronic memory media. Further alternatively or additionally, at least some of the functions of processor 48 may be carried out by suitable analog and/or digital hardware processing circuits.

Automatic Nuclearization of Transcribed Text

In particular, system 40 performs a process that is referred to herein as text nuclearization or sentence nuclearization. The nuclearization process removes selected words or phrases from each sentence, so as to retain a compact "nucleus" that captures the essence or meaning of the sentence. The system then correlates nuclear sentences that are similar to one another, and computes the occurrence frequencies of the nuclear sentences. The occurrence frequencies of the different nuclear sentences can then be used for performing various analytics functions with respect to the nuclear sentences. The nuclearization process and its uses are described in detail further below. In some embodiments, system 40 automatically partitions segments of transcribed text (e.g., transcribed telephone calls) into individual sentences before performing sentence nuclearization.

Note that although the description that follows refers to sentences, the methods and systems described herein are in no way limited to processing sentences, and are similarly applicable to various other kinds of semantic constructs, such as complex phrases or segmented discourse.

By performing text nuclearization, system 40 brings different transcribed sentences to a common, comparable form. Once the different sentences are brought to such form, sentences that convey similar meanings can be associated with one another and various statistics can be computed over them. For example, assume that the transcription database of a retail call center comprises sentences such as "I would like to complain about a problem in the model XXX camera," "The camera I bought from you has a problem" and "Your cameras have major problems." Sentence nuclearization would refine the similar essence conveyed in all three sentences, namely "camera-problem". Without nuclearization, the similarity between the three sentences would probably be missed. By applying nuclearization, the system can detect the fact that sentences related to camera problems occur frequently, and invoke appropriate action.

The text nuclearization methods described herein are based on grammatical analysis of the transcribed text. As will be explained in detail below, the body of text that is used as input comprises semantic elements (e.g., words or phrases) having certain syntactic roles. For example, a certain phrase within the text may have the syntactic role of a verb clause or a subject clause. A certain word in the text may have the s syntactic role of a verb, a subject or an object. Other semantic roles of words or phrases will be apparent to those skilled in the art.

A number of processes for performing grammatical analysis of text are known in the art, and any suitable grammatical analysis process can be used for this purpose by processor 48. Exemplary processes are described by Grinberg et al., in "A Robust Parsing Algorithm for Link Grammars", Proceedings of the Fourth International Workshop on Parsing Technologies, Prague, Czech Republic, September, 1995, which is incorporated herein by reference, and by Beale in "A Probabilistic Approach to Grammatical Analysis of Written English by Computer," Proceedings of the European Chapter of the Association for Computational Linguistics, Geneva, Switzerland, 1985, pages 159-165.

A typical grammatical analysis process recognizes the syntactic roles of the different semantic elements of input text by representing a given sentence as a hierarchical structure (tree) having subordinate and super-ordinate branches connected at nodes. A tree may be produced, for example, by assigning each word in the sentence a certain part-of-speech, such as using a dictionary. For example, the following table shows the assignment of parts-of-speech to the words in the sentence "The dog ate the bone":

| Word | Part-of-speech |
| --- | --- |
| the | D—determiner (article) |
| dog | N—noun |
| ate | V—verb |

-continued

| Word | Part-of-speech |
| --- | --- |
| the | D—determiner (article) |
| bone | N—noun |

Each word is represented by a leaf of the tree. After assigning the parts-of-speech, words are grouped ("chunked") together into clauses based on the parts-of-speech assigned to the words, for example using grammatical rules or statistical data. Each chunking operation is represented by a node in the tree. In the example above, the word pair "the dog" is chunked into a noun phrase (NP). Similarly, the pair "the bone" is chunked into a NP, and this NP is in turn chunked with the verb "ate" to form a Verb Phrase (VP). The VP and the "the dog" NP are then chunked to form the complete Sentence (S). Chunking ends when all possible combinations are exhausted or when the process reaches the state where there exists only one root node (S).

The description that follows refers mainly to a body of text that is partitioned into sentences, which are in turn partitioned into phrases and words. The methods and systems described herein, however, are similarly applicable to other forms of partitioning a body of text into semantic constructs that are in turn partitioned into semantic elements. Thus, a word or phrase is regarded herein as an example of a semantic element, and a sentence is regarded herein as an example of a semantic construct.

Processor 48 performs text nuclearization by representing individual sentences using hierarchical data structures, which are referred to herein as trees. The hierarchical data structures represent the hierarchical relationships among the different semantic elements of the sentence. Processor 48 automatically processes the body of text so as to generate the hierarchical data structures, by automatically recognizing the syntactic roles of the different semantic elements found in the text.

Figure 2:
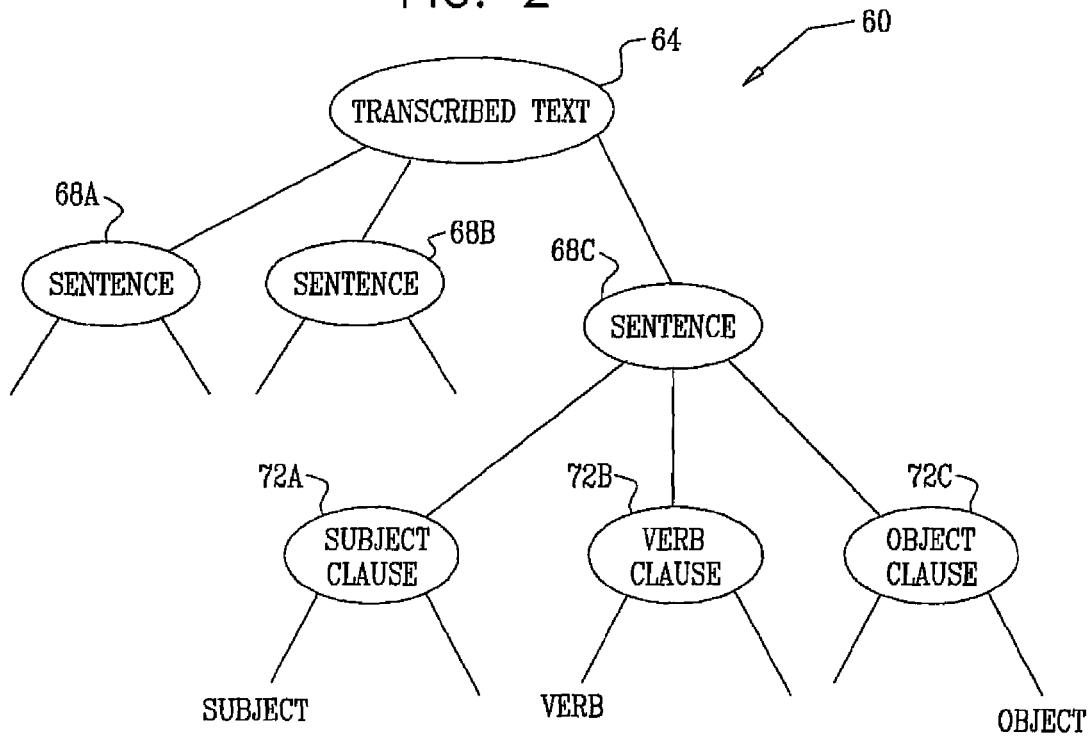
FIG. 2 is a schematic illustration of a hierarchical grammatical representation of a body of transcribed text, in accordance with an embodiment of the present disclosure.

FIG. 2 is a schematic illustration of a hierarchical grammatical representation of a body of transcribed text, as generated by processor 48 in accordance with an embodiment of the present disclosure. A given body of transcribed text is represented in the present example by a hierarchical tree 60. A root 64 of tree 60 represents the entire body of text. The text is partitioned into three sentences 68A ... 68C. Each sentence is further partitioned into clauses having particular syntactic roles. For example, sentence 68C is partitioned into a subject clause 72A, a verb clause 72B and an object clause 72C. Each clause is further partitioned into words having certain syntactic roles, such as a subject, a verb or an object. Processor 48 may apply any suitable grammatical analysis method known in the art, such as the methods cited above, in order to represent the body of text and the sentences contained therein using a hierarchical data structure.

Nuclearization Method Description

Figure 3:
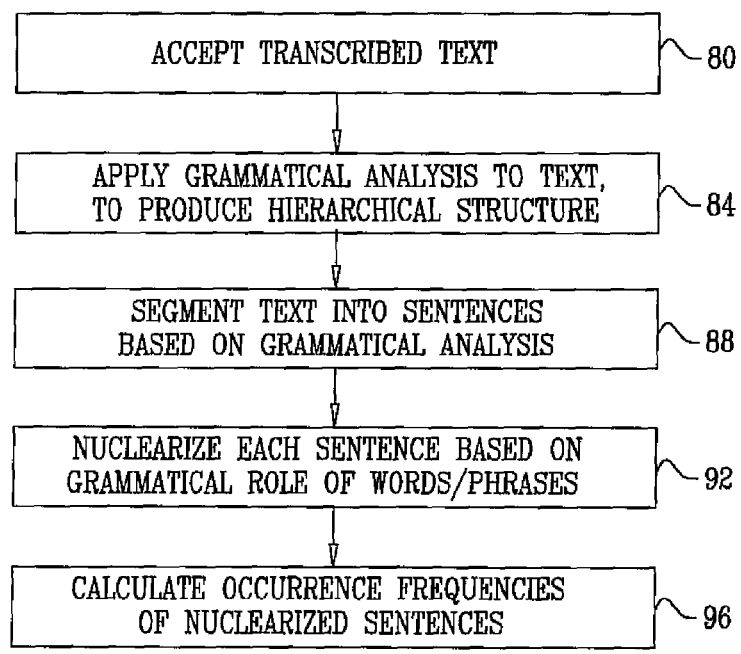
FIG. 3 is a flow chart that schematically illustrates a method for text nuclearization, in accordance with an embodiment of the present disclosure.

FIG. 3 is a flow chart that schematically illustrates a method for text nuclearization, in accordance with an embodiment of the present disclosure. The method begins with processor 48 accepting, via interface 44, a body of transcribed text, at an input step 80. The body of text may comprise transcribed text of a call center session, part of a session or a number of sessions.

Processor 48 represents the body of text in terms of a hierarchical data structure, at a hierarchical representation step 84. The processor applies grammatical analysis to the body of text, so as to recognize the syntactic roles of the different semantic elements found in the text. Then, the processor produces the hierarchical representation of the text based on the recognized syntactic roles.

In some embodiments, processor 48 automatically segments the body of text into individual sentences, at a segmentation step 88. Segmentation is performed based on the syntactic roles that were recognized by the processor at step 84 above. In alternative embodiments, the body of text is provided to processor 48 as a pre-segmented set of individual sentences a-priori. In these embodiments, step 88 is omitted.

At this stage, the processor has automatically generated a set of hierarchical data structures that respectively represent the individual sentences found in the input body of text.

Processor 48 now nuclearizes the sentences to produce a corresponding set of nuclear sentences, at a nuclearization step 92. The nuclearization process removes words or phrases that are regarded as having lower significance from each sentence, in order to retain only the words or phrases that carry the essence or meaning of the sentence. In other words, the processor processes the set of hierarchical data structures, so as to produce a set of nuclear, diluted data structures. The nuclear data structures comprise a subset of the semantic elements that are regarded as important.

For example, consider the two sentences:
I had a problem with my computer.
I am having a problem with my new computer.
Grammatical analysis of these sentences partitions each sentence into subject, verb and object clauses:
  subj(i) verb(had) object(a problem preposition(with my computer)).
  subj(i) verb(am having) object(a serious problem preposition(with my new computer)).
After retaining only the significant elements in each clause, both sentences are converted to the same nuclear sentence: I have problem (with computer).

As another example, consider the following two sentences:
The new machine crashed soon after it was powered on.
The orange squeezing machine has just crashed.
Grammatical analysis of these sentences partitions each sentence into the following clauses:
  subj(The new machine) verb(crashed) adv(soon after it was powered on).
  subj(The orange squeezing machine) verb(has just crashed).
The nuclearization process translates both sentences to the same nuclear sentence: Machine crash.

Having produced a set of nuclearized sentences, processor 48 calculates the occurrence frequencies of the different nuclear sentences, at a frequency calculation step 96. The processor aggregates similar nuclear sentences, so that frequently-occurring nuclear sentences are given high statistical significance.

Processor 48 of system 40 invokes appropriate action based on the calculated occurrence frequencies of the nuclear sentences. In some embodiments, the processor invokes action with respect to one or more of the nuclear sentences whose occurrence frequencies meet a certain condition. For example, the processor may prioritize the nuclear sentences in accordance with their occurrence frequencies, and present the nuclear sentences whose occurrence frequencies exceed a predefined threshold to the analyst. As another example, the processor may trigger an alert if a nuclear sentence having a frequency that exceeds a certain threshold is found. Additionally or alternatively, processor 48 may evaluate any other suitable condition and invoke any other suitable action.

As can be appreciated, the decision as to which words or phrases to remove and which to retain can be based on various criteria. Different trade-offs exist between the amount or depth of nuclearization, the statistical significance of the nuclearization process and the potential loss of meaningful information. For example, deep nuclearization (i.e., removal of a large number of words or phrases from the sentences) typically enables the processor to aggregate larger numbers of sentences that carry similar meanings. On the other hand, deep nuclearization increases the risk of removing significant words or phrases. Thin nuclearization retains more of the information originally conveyed in the sentences, but may provide less statistical significance and enable a smaller degree of association of similar sentences.

In some embodiments, the analyst may predefine the desired nuclearization depth, such as by specifying the level of the hierarchical data structure at which nuclearization is to be performed. In these embodiments, processor 48 accepts the a-priori depth definition and performs nuclearization accordingly. For example, each word may be assigned a certain importance level, based on its position in the hierarchical data structure. When performing nuclearization, processor 48 removes words whose importance levels are lower than the user-defined nuclearization depth. The sentence "I had a problem with my computer" can be nuclearized to "computer problem" or even to "problem," depending on the desired nuclearization depth.

The adjustable nuclearization depth setting can be used in various ways. For example, a certain nuclearization depth may be predefined as a default value for all system deployments. As another example, a user may test the nuclearization performance under different nuclearization depths to achieve different results. Additionally or alternatively, processor 48 may apply an automatic or semi-automatic process that adjusts the nuclearization depth and attempts to reach an optimum value with respect to certain criteria. Further additionally or alternatively, processor 48 may perform multiple nuclearization processes on the same body of text using respective, different depths, and aggregate the results from the different processes.

Typically, processor 48 calculates the occurrence frequencies of the nuclear sentences by scanning the set of nuclear sentences and accumulating the occurrences of each nuclear sentence. In some embodiments, different occurrences may be assigned different weights, and the processor applies the weights when accumulating the occurrences. In some cases, different occurrences of a given nuclear sentence are given different weights. As a result, different occurrences of this sentence contribute differently to the accumulated occurrence frequency of the sentence.

In addition to the nuclearization operations described above, processor 48 may apply other operations to the processed set of sentences. For example, the processor may reorganize the order of words in the sentence, apply word stemming, resolve synonyms, associate similarly-sounding words and/or perform any other action that assists in associating sentences having similar semantic meanings with one another and bringing them to a comparable form.

Although the embodiments described herein mainly refer to transcribed text that originates from audio of call center sessions, the principles of the present disclosure can also be applied in other applications, such as in automated transcription or dictation applications.

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art.

The invention claimed is:

1. A computer-implemented method for text processing, comprising:

processing at least one body of text comprising semantic elements;

recognizing respective syntactic roles of the semantic elements, wherein syntactic roles of the different semantic elements are represented by a given sentence as a hierarchical structure such as a tree, having subordinate and superordinate branches connected at nodes;

segmenting the body of text into individual semantic constructs;

removing at least one selected semantic element from the semantic constructs, so as to produce respective nuclear semantic constructs;

computing respective occurrence frequencies of the nuclear semantic constructs;

aggregating similar nuclear constructs, so that frequently occurring nuclear constructs are given high statistical significance; and invoking an action with respect to one or more of the nuclear semantic constructs whose occurrence frequencies meet a predefined condition, wherein removing the at least one selected semantic elements comprises predefining a nuclearization depth, and determining the selected semantic elements to be removed responsively to the predefined nuclearization depth, wherein computing the occurrence frequencies comprises assigning respective weights to occurrences of the nuclear semantic constructs, and computing the occurrence frequencies responsively to the weights.

2. The method according to claim 1, wherein the body of text comprises transcribed audio of call center sessions.

3. The method according to claim 1, wherein invoking the action comprises prioritizing at least some of the nuclear semantic constructs and presenting the prioritized nuclear semantic constructs to a user.

4. The method according to claim 1, wherein the semantic constructs comprise sentences.

5. A computer-implemented method for text processing, comprising:

processing one or more semantic constructs comprising semantic elements;

recognizing respective syntactic roles of the semantic elements, wherein syntactic roles of the different semantic elements are represented by a given sentence as a hierarchical structure such as a tree, having subordinate and superordinate branches connected at nodes;

representing the semantic constructs by respective hierarchical data structures, which represent hierarchical relationships among the semantic elements of the respective semantic constructs;

removing at least one selected semantic element from the hierarchical data structures, so as to produce respective nuclear data structures;

aggregating similar nuclear constructs, so that frequently occurring nuclear constructs are given high statistical significance;

invoking an action with respect to the nuclear data structures; and computing respective occurrence frequencies of the nuclear data structures, wherein invoking the action comprises invoking the action with respect to one or more of the nuclear data structures whose occurrence frequencies meet a predefined condition, wherein removing the at least one selected semantic element comprises predefining a nuclearization depth, and determining the selected semantic elements to be removed responsively to the predefined nuclearization depth.

6. The method according to claim 5, wherein the semantic constructs comprise transcribed audio of call center sessions.

7. The method according to claim 5, wherein invoking the action comprises prioritizing at least some of the nuclear data structures and presenting the prioritized nuclear data structures to a user.

8. The method according to claim 5, wherein the semantic constructs comprise sentences.

9. Apparatus for text processing, comprising:

an interface, which is operative to accept a body of text, which originates from audio of call center sessions and comprises semantic elements; and a processor, which is coupled to process the body of text so as to recognize respective syntactic roles of the semantic elements, to segment the body of text into individual semantic constructs responsively to the recognized syntactic roles, wherein syntactic roles of the different semantic elements are represented by a given sentence as a hierarchical structure such as a tree, having subordinate and superordinate branches connected at nodes, to remove selected semantic elements from the semantic constructs so as to transform the semantic constructs into respective nuclear semantic constructs, to compute respective occurrence frequencies of the nuclear semantic constructs, to aggregate similar nuclear constructs, so that frequently occurring nuclear constructs are given high statistical significance; and to invoke an action with respect to one or more of the nuclear semantic constructs whose occurrence frequencies meet a predefined condition, wherein the processor is coupled to accept a definition of a nuclearization depth, and to determine the selected semantic elements to be removed responsively to the nuclearization depth wherein the processor is coupled to assign respective weights to occurrences of the nuclear semantic constructs and to compute the occurrence frequencies responsively to the weights.

10. The apparatus according to claim 9, wherein the processor is coupled to prioritize at least some of the nuclear semantic constructs and to present the prioritized nuclear semantic constructs to a user.

11. Apparatus for text processing, comprising:

an interface, which is operative to accept one or more semantic constructs, which originate from audio of call center sessions and comprise semantic elements; and a processor, which is coupled to process the one or more semantic constructs so as to recognize respective syntactic roles of the semantic elements, to represent the semantic constructs by respective hierarchical data structures responsively to the recognized syntactic roles, wherein syntactic roles of the different semantic elements are represented by a given sentence as a hierarchical structure such as a tree, having subordinate and superordinate branches connected at nodes, such that the data structures represent hierarchical relationships among the semantic elements of the respective semantic constructs, to remove selected semantic elements from the hierarchical data structures so as to transform the data structures into respective nuclear data structures, to aggregate similar nuclear constructs, so that frequently occurring nuclear constructs are given high statistical significance; and to invoke an action with respect to the nuclear data structures, wherein the processor is further coupled to compute respective occurrence frequencies of the nuclear data structures and to invoke the action with respect to one or more of the nuclear data structures whose occurrence frequencies meet a predefined condition, wherein the processor is coupled to accept a definition of a nuclearization depth, and to determine the selected semantic elements to be removed responsively to the nuclearization depth.

12. The apparatus according to claim 11, wherein the processor is coupled to prioritize at least some of the nuclear data structures and to present the prioritized nuclear data structures to a user.

\* \* \* \* \*